United States Patent [19]
Masterson et al.

[11] Patent Number: 5,890,757
[45] Date of Patent: Apr. 6, 1999

[54] TRACTOR TRAILER COVER ASSEMBLY

[76] Inventors: Patrick C Masterson, P.O. Box 417, North Hatley, Canada, J0B 2C0; Mark Newman, Box 32, Lindsay, Canada, K9V 4R8

[21] Appl. No.: 826,668

[22] Filed: Apr. 7, 1997

[51] Int. Cl.⁶ ........................................................ B60P 7/02
[52] U.S. Cl. ........................ 296/100.02; 296/36; 296/181; 296/26.04; 296/43
[58] Field of Search ................................. 296/100, 100.01, 296/100.02, 100.03, 100.04, 100.05, 26.04, 26.05, 26.01, 43, 36, 181; 414/498

[56] References Cited

U.S. PATENT DOCUMENTS

| | | | |
|---|---|---|---|
| 1,861,906 | 6/1932 | Bradburn | 296/26.05 |
| 2,797,124 | 6/1957 | Hauptli | 296/26.05 |
| 2,949,867 | 8/1960 | Ramsey | 296/100.02 |
| 3,694,024 | 9/1972 | Linville | 296/26.05 |
| 3,802,732 | 4/1974 | McKee | 296/26.05 |
| 4,392,682 | 7/1983 | Norkus, Jr. | 296/26.05 |
| 5,417,540 | 5/1995 | Cox | 414/498 |
| 5,593,272 | 1/1997 | Green | 414/498 |
| 5,692,794 | 12/1997 | Kelsch et al. | 296/100.04 |

OTHER PUBLICATIONS

Data Base DAta "Prior Art #1".
Data Base Data "Prior Art #2".

*Primary Examiner*—Dennis H. Pedder
*Assistant Examiner*—Kiran Patel
*Attorney, Agent, or Firm*—James E Gastle

[57] ABSTRACT

Disclosed herein is a cover for a semi-trailer vehicle having a cargo support surface bordered by a pair of longitudinal edge regions. The cover has a roof and a pair of side walls forming a cargo receiving passage therebetween; each of the pair of side walls terminating at a longitudinal free edge region to expose the cargo receiving passage to the cargo support surface. A lifting arrangement lifts the cover between a first position above the cargo support surface and a second position in abutment with the cargo support surface. Couplings removably couple each of the longitudinal free edge regions to a corresponding longitudinal edge region.

18 Claims, 14 Drawing Sheets

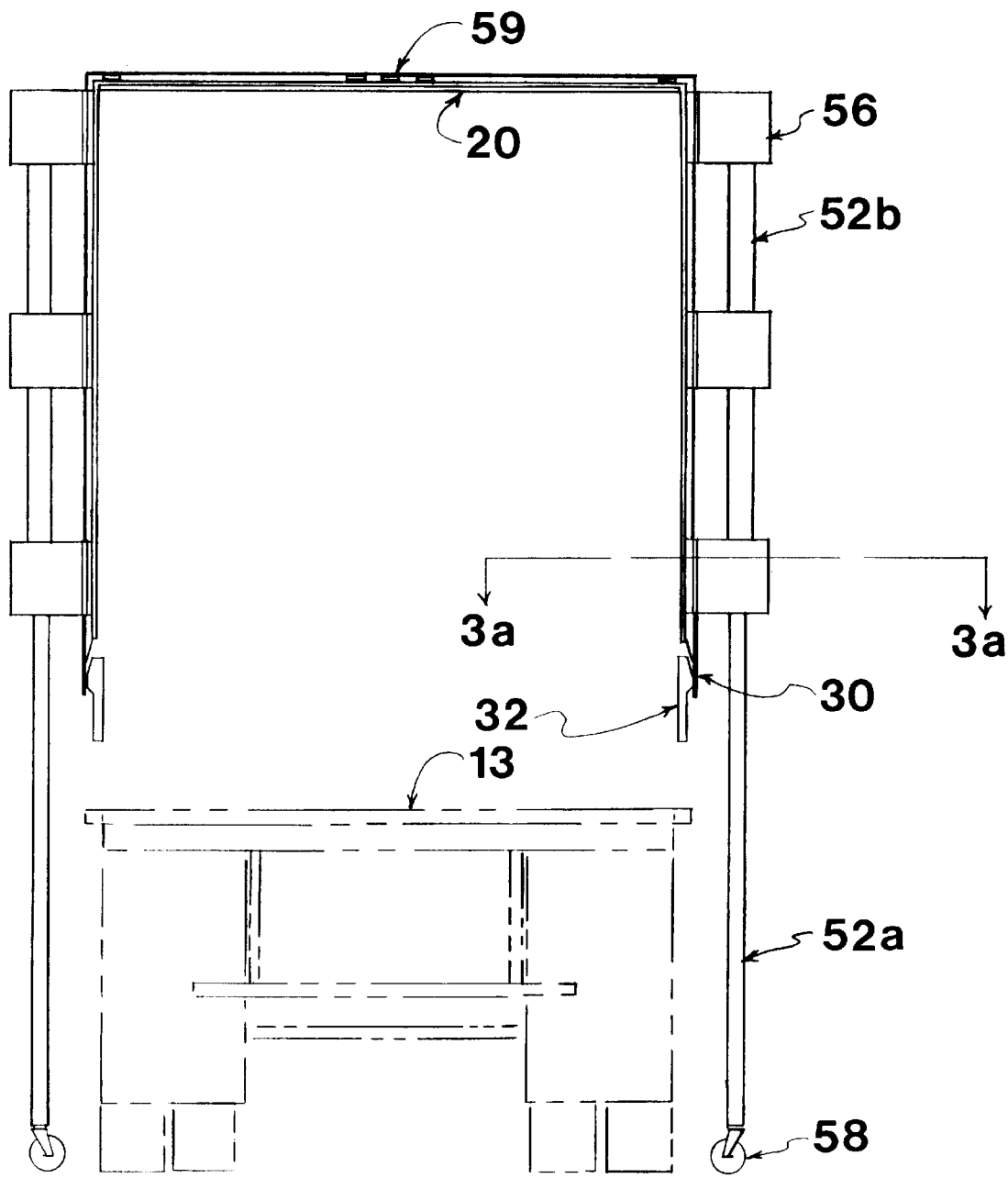
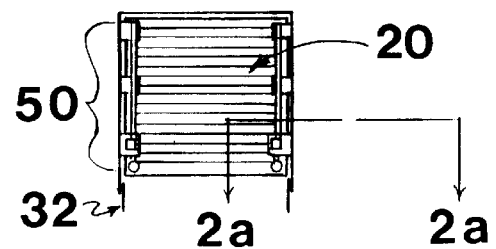
Fig. 3
Fig. 2

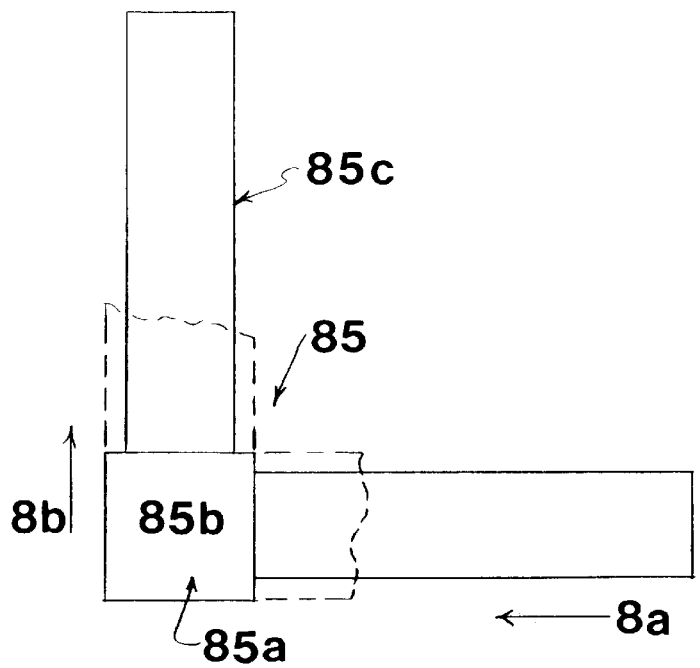
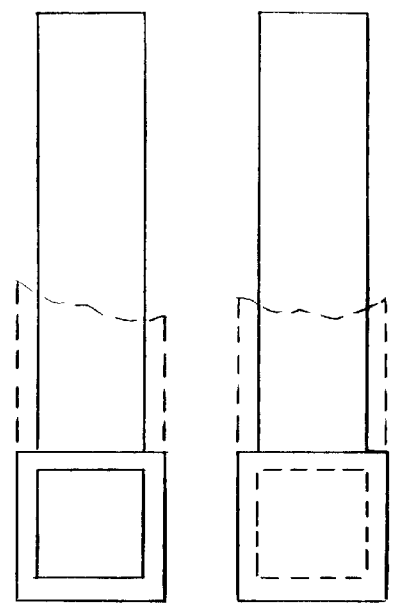
Fig. 8   Fig. 8a   Fig. 8b
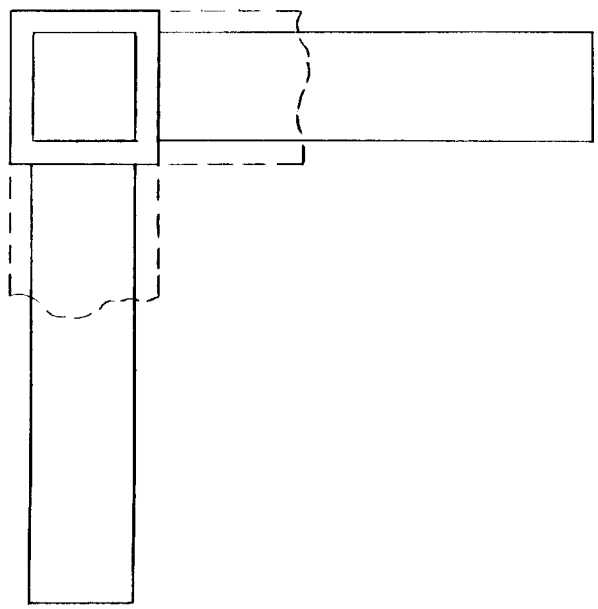
Fig. 9

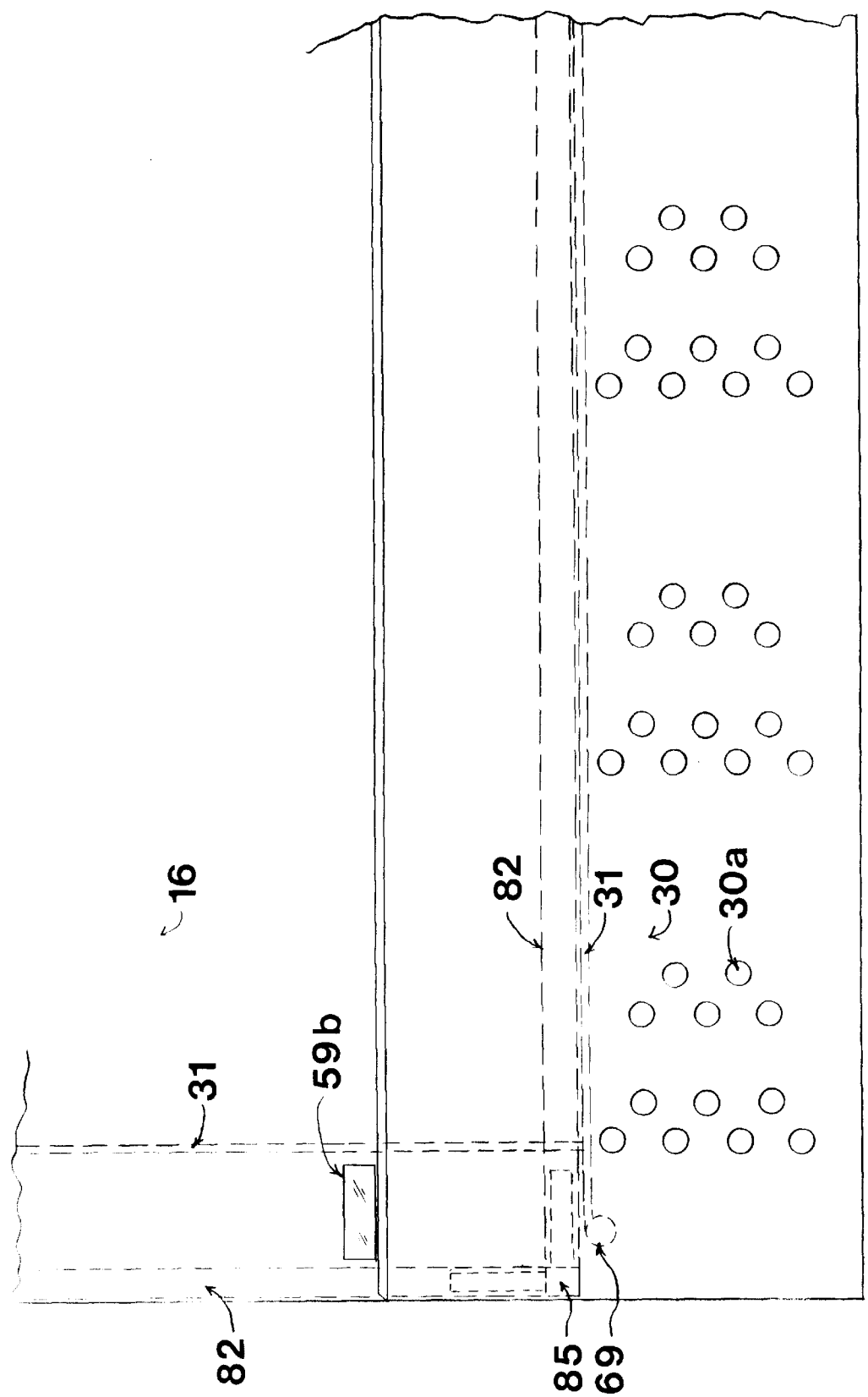

TRACTOR TRAILER COVER ASSEMBLY

BACKGROUND OF THE INVENTION

1. Field of the Invention

The present invention relates to semi-trailer vehicles and more particularly to methods of covering cargo on semi-trailers, such as 'flat deck' trailers.

2. Description of the Related Art

Most durable goods and raw materials are shipped by semi-trailer vehicles on the public highways of the developed world. These vehicles are known to have a tractor unit and a semi-trailer unit, the trailer coming in a variety of arrangements depending on its intended cargo. The trailer, for example, may be a van type with a substantially weather proof interior cargo hold, or a flat bed or flat deck trailer. In the latter case, the cargo must be covered in some fashion to protect the cargo from the elements. Conventionally this is done by flexible tarps wrapped around the cargo and fastened in place with rope or elastic fastener materials.

Other covers for the cargo on a flat deck trailer are sold under the tradenames "ROLL BACK" or "ROLL TITE". These covers are individually installed and permanently fitted to each individual flat deck trailer. This is done by modifying the trailer by removing the 'rub rail' from the periphery of the trailer. Other tarping arrangements include rack and tarp arrangements which have modified posts placed along the periphery of the flat deck trailer to position plywood sheets in an upright position. The tarp is then stretched over the cargo or, in the case of the rack and tarp arrangements, stretched over the space between the sheets to provide a measure of weather protection for the cargo.

Though tarps arrangements such as this are generally satisfactory, they do have some inherent weaknesses. For example, the tarps are relatively heavy and difficult to handle when manually stretched over the cargo. They tend to rip or simply become unfastened due to the buffeting wind forces exerted on the tarp during use. In either case, the cargo can become exposed to the elements and therefore be damaged. Tarped flat deck trailers also do not have important clearance lighting, thus increasing the risk of traffic accidents.

It is an object of the present invention to provide obviate these disadvantages.

SUMMARY OF THE INVENTION

Briefly stated, the invention involves a cover for a semi-trailer vehicle having a cargo support surface bordered by a pair of longitudinal edge regions, the cover comprising a roof and a pair of side walls forming a cargo receiving passage therebetween; each of the pair of side walls terminating at a longitudinal free edge region to expose the cargo receiving passage to the cargo support surface, lifting means for lifting the cover between a first position above the cargo support surface and a second position in abutment with the cargo support surface, and coupling means for removably coupling each of the longitudinal free edge regions to a corresponding longitudinal edge region.

In another aspect of the present invention, there is provided a method of covering cargo on a semi-trailer vehicle having a cargo support surface bordered by a pair of longitudinal edge regions, comprising the steps of:

providing a cover with a roof and a pair of side walls forming a cargo receiving passage therebetween;

providing each of the pair of side walls with a longitudinal free edge region in order to expose the cargo receiving passage to the cargo support surface, lifting the cover to a first position above the cargo support surface;

lowering the cover to a second position in abutment with the cargo support surface, and removably coupling each of the longitudinal free edge regions to a corresponding longitudinal edge region.

In another aspect of the present invention, there is provided a cover for a semi-trailer vehicle having a cargo support surface bordered by a pair of longitudinal edge regions, the cover comprising a unitary structure having a roof, a pair of side walls forming a cargo receiving passage therebetween; each of the edge regions including an upwardly directed longitudinal rail member, each of the side walls including a lower edge region with a transverse gap formed therein for receiving the rail member, and releasable locking means for locking each of the lower edge regions relative to the cargo support surface, with each of the rails engaged the corresponding gap.

In another aspect of the present invention, there is a method for covering cargo on a semi-trailer vehicle having a cargo support surface bordered by a pair of longitudinal edge regions, each of the edge regions including an upwardly directed longitudinal rail member the method comprising the steps of:

providing a roof and a pair of side walls forming a cargo receiving passage therebetween;

forming in each of the side walls a lower edge region with a transverse gap therein for receiving the rail member, and releasably locking each of the lower edge regions relative to the cargo support surface, with each of the rails engaged the corresponding gap.

In still another aspect of the present invention, there is provided a cover for a semi-trailer vehicle having a cargo support surface bordered by a pair of longitudinal edge regions, the cover comprising a unitary structure having a roof, a pair of side walls forming a cargo receiving passage therebetween; each of the edge regions having a rub rail member forming an outermost periphery thereof, each of the side walls including a lower edge region with an inner face formed thereon, releasable locking means for locking each of the lower edge regions relative to the cargo support surface, to engage the rub rail with the inner face, substantially along the entire length thereof.

In yet another aspect of the present invention, there is provided a method for covering cargo on a semi-trailer vehicle having a cargo support surface bordered by a pair of longitudinal edge regions, each of the edge regions including a rub rail member forming an outermost periphery thereof; the method comprising the steps of:

forming on each of the side walls, a lower edge region with an inner face formed thereon, and releasably locking each of the lower edge regions relative to the cargo support surface, to form a substantially continuous engagement of the rub rail with the inner face.

BRIEF DESCRIPTION OF THE DRAWINGS

Several preferred embodiments of the present invention will now be described, by way of example only, with reference to the appended drawings in which:

FIG. 1b is a sectional view taken on line 1b—1b of FIG. 1a

FIG. 2 is an end view of the cover illustrated in FIG. 1 in one operative position;

FIG. 3 is a magnified view of the cover according to FIG. 2 in another operable position;

FIG. 8 is a fragmentary assembly view taken arrow 8 of FIG. 6;

FIG. 8a is a view taken on arrow 8a of FIG. 8;

FIG. 8b is a view taken on arrow 8b of FIG. 8;

FIG. 9 is a fragmentary assembly view taken arrow 9 of FIG. 6;

FIG. 13 is a side view of one component of the portion illustrated in FIG. 1a;

FIG. 15 is a magnified view of the region encircled at 15 in FIG. 5.

DESCRIPTION OF THE PREFERRED EMBODIMENTS

Figure 1:
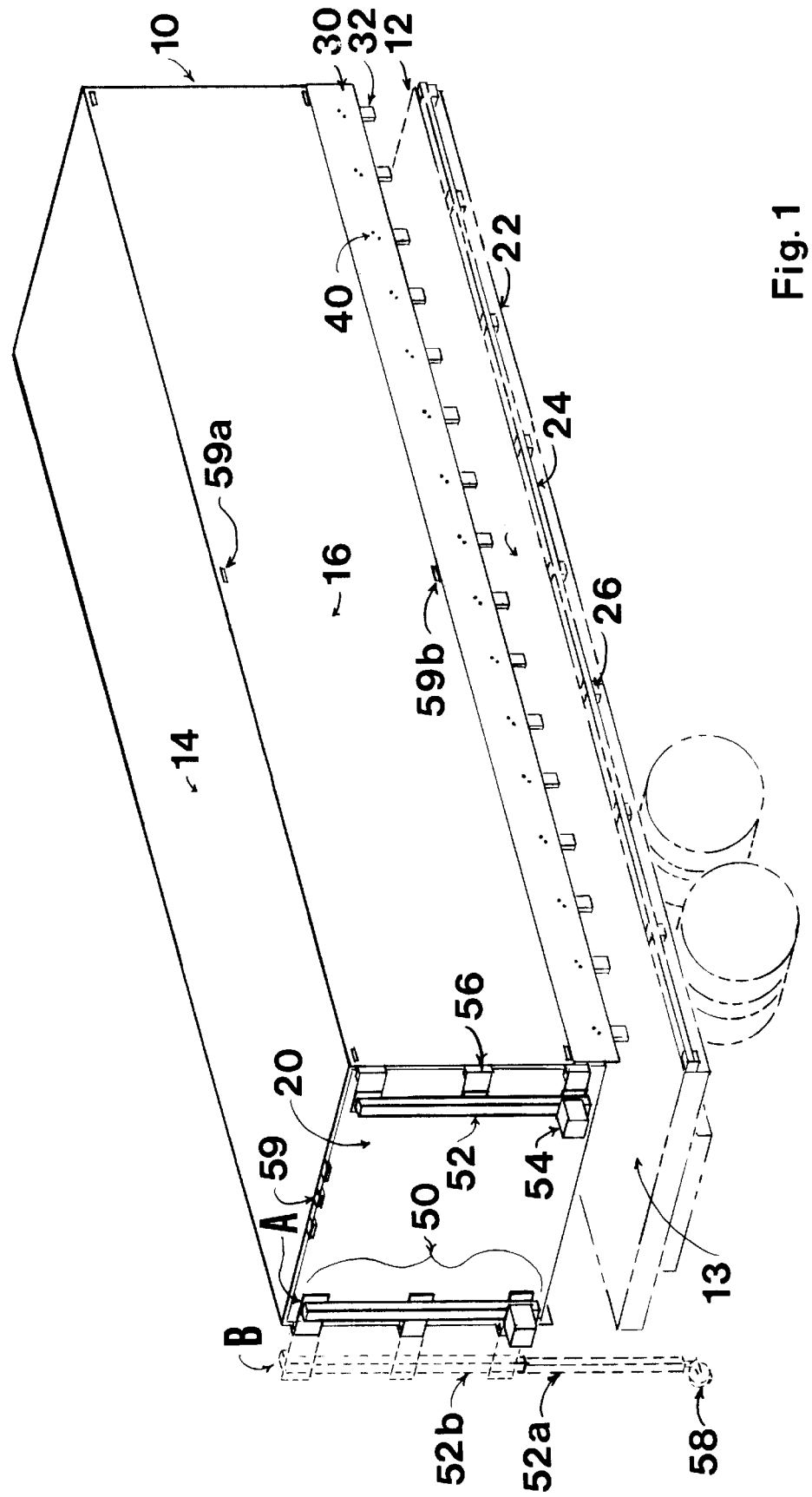
FIG. 1 is a perspective view of a cover for a flat deck semi-trailer vehicle.

Referring to the Figures, there is provided a cover 10 for a flat deck semi-trailer vehicle 12 having a deck 13 with a cargo support surface 13a. As will be described in more detail below, the cover has a unitary structure having a roof 14, a pair of side walls 16 forming a cargo receiving passage therebetween. Each of the side walls should be sufficiently long to accommodate standard flat-deck trailers such as those having the typical length of 45', and a height of about 8'7". The roof may have similar length of about 45' and a width of about 8'6". Dimensions such as these should allow the cover to conform to trailer manufacturers' specifications, and to the Roads and Transport Association of Canada, as well as to the applicable Canadian and U.S. department of transportation specifications. Other dimensions may also be used. For example, a cover that is 45' long may be used, if desired, to cover a cargo having a length of 45' or less on a trailer which is 45' or longer. Alternatively, the cover may only be a portion of the length of the trailer.

A pair of end wall portions are joined to the side wall and roof portions so as to close the cargo-receiving passage. At least one of the end wall portions includes an retractable access door, known as an overhead door 20. In this case, each end wall portion has an overhead door as shown.

The deck 13 includes a longitudinal periphery 22 including a pair of longitudinal edge regions and means is provided for engaging the cover with the trailer adjacent the longitudinal periphery. As is typical with flat deck trailers of this type, the trailer has an upwardly directed longitudinal rail member in the form of a rub rail 24 which is positioned on the deck adjacent the periphery and is supported by a number of spaced support flanges 26, which together with the rub rail form a plurality of pockets, known as stake pockets and a plurality of passages each between a pair of stake pockets. As can be seen by FIG. 1a, the rub rail may also be positioned by way of pipe supports shown in phantom at 28.

As will be described, each of the side walls terminates at a longitudinal free edge region to expose the cargo receiving passage to the cargo support surface. In addition, coupling means is provided for removably coupling each of the longitudinal free edge regions to a corresponding longitudinal edge region.

The coupling means are in the form of coupling members 32 for projecting through the passages. In this case, the coupling members are spaced along the skirt portion and each includes an upper section 32a for attachment to the skirt portion and a lower section 32b laterally spaced from the skirt portion so as to form a gap 34 therebetween to receive the rub rail in the engaged position as shown in FIG. 1b. Each coupling member is independently adjustably mounted to the lower skirt portion.

Each of the coupling members also includes an intermediate section 32c with an inner surface being inclined relative to and facing the gap so as to draw the rub rail into abutment with the lower edge region. In this manner, the lower edge region is arranged to extend below the cargo support surface and the coupling members are arranged to draw the inner face of the skirt portion tight to the outer face of the rub rail to provide a tight fit so as not to exceed approved widths of trailers.

For example, the coupling members may be about 2" thick×4" wide×12" high with a pattern of coupling member mounting holes 32e to allow for independent vertical adjustment each of the coupling members relative to mating holes 30a formed in the lower skirt portion. In this example, there may not only be 92 inches of effective width of coupling member applied along the length of the side wall but there may also be 540 square inches of effective width of the lower skirt portion bearing against the rub rail, that is by being held tight against the rub rail with an exemplified skirt overhang of 1 inch.

A plurality of removable pin members, for example swivel lock steel pins 40, are provided for releasably and adjustably mounting the upper section of each of the coupling members to the lower skirt portion by way of mating holes 32e, 30a respectively formed in each. A plurality of removable pin members, such as tension lock steel pins 42, are also provided for inhibiting removal of the coupling member from the passage and extend through the holes 32d in the lower section 32b. The lower skirt portion 30 also has a conduit 31 for a motor control circuit as will be described. The conduit 31 is held in place by a molded polymer material at the inside face of the lower skirt portion and at the junction with the lower edge of the side wall.

Figure 1A:
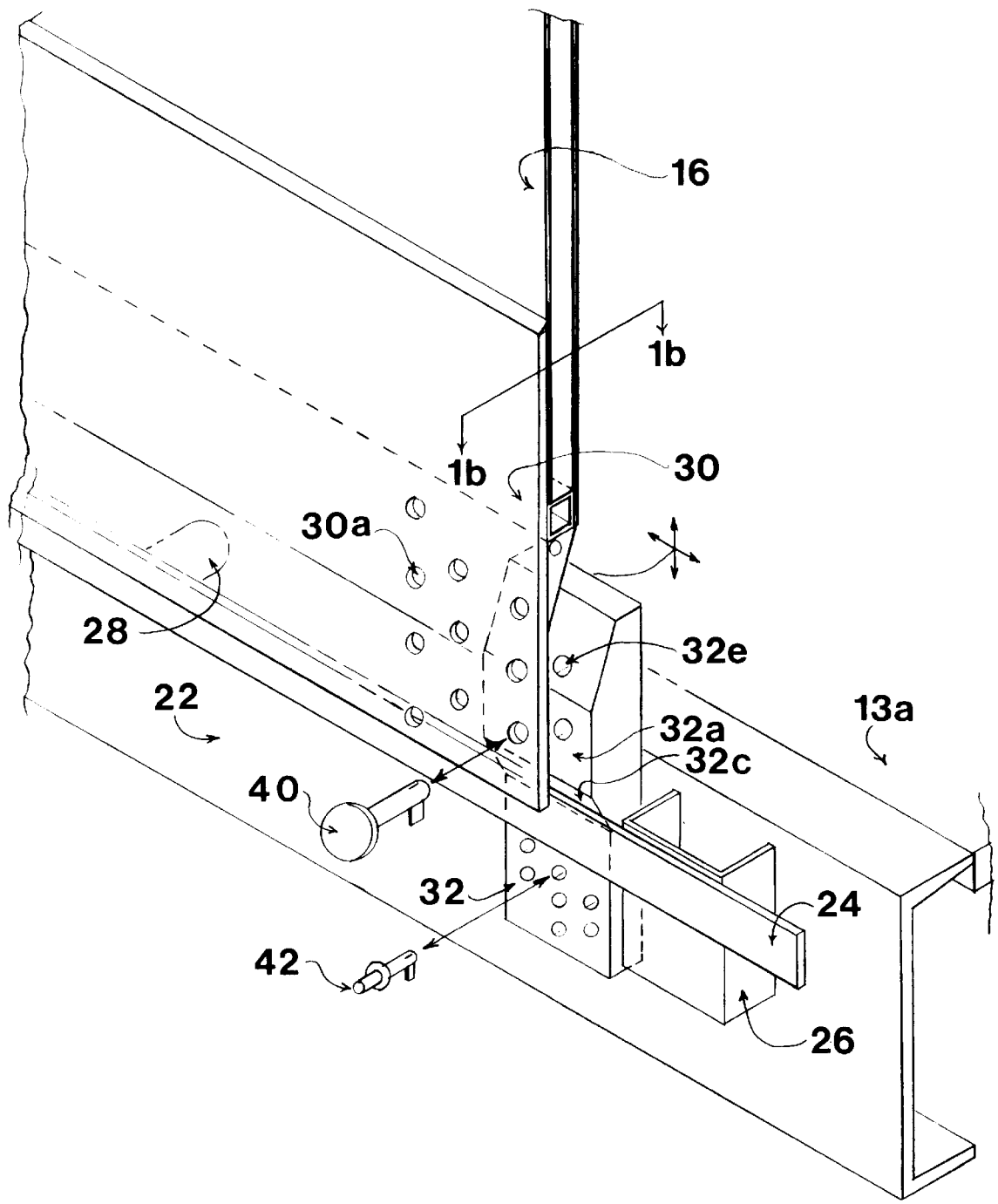
FIG. 1a magnified fragmentary perspective of a portion of the cover illustrated in FIG. 1 in an operative position.
Figure 1B:
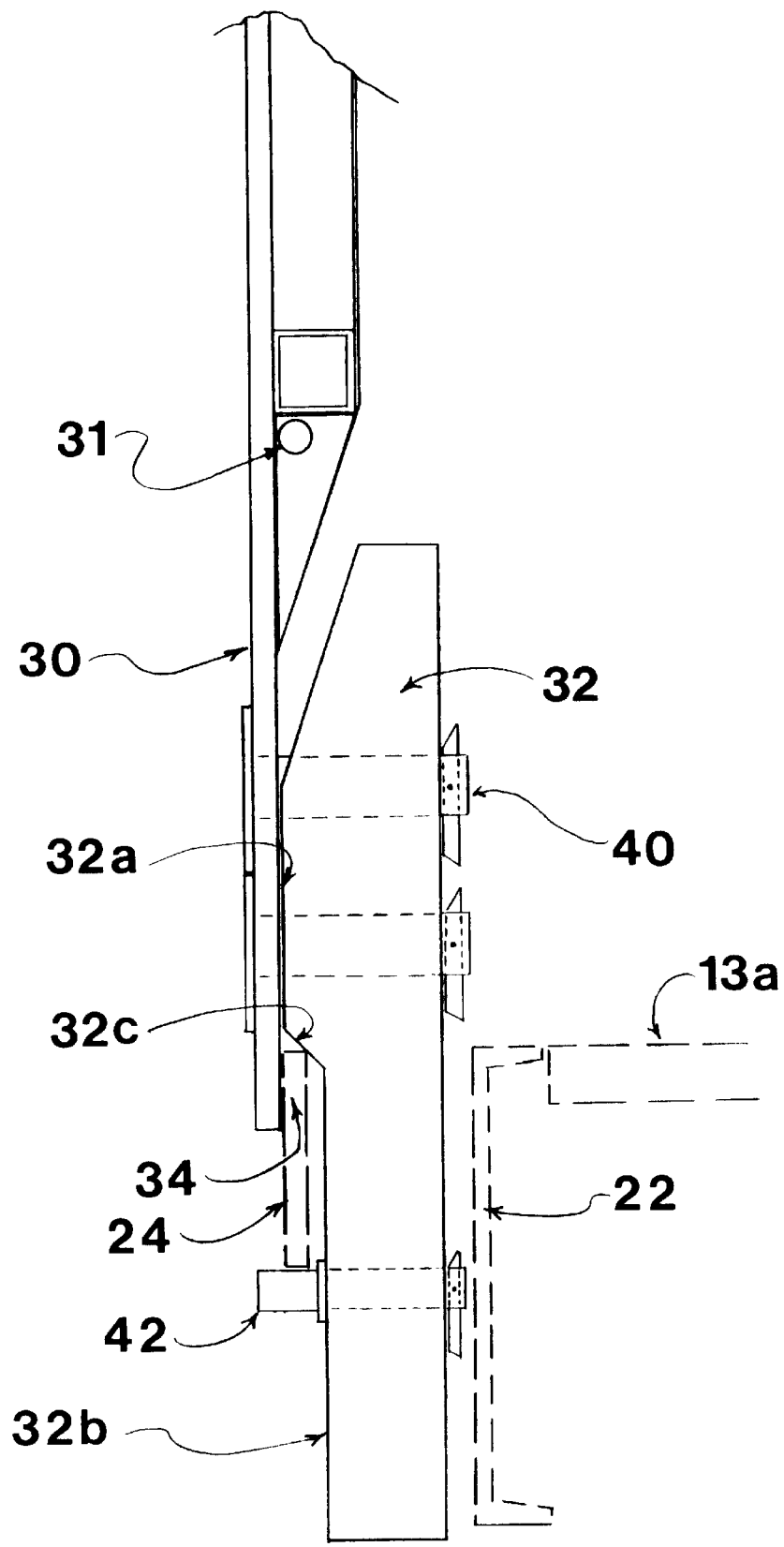

Referring to FIG. 1, lifting means is provided for lifting the cover between a first position above the cargo support surface and a second position in abutment with the cargo support surface, In this case, the lifting means includes a plurality of spaced leg arrangements extending below the cover, one of which is shown at 50. The leg arrangements are length extensible and each includes a jack portion 52, such as a casterjack. A particular feature of the leg arrangement is the use of a weather protected motor and a reduction gearbox, collectively shown at 54.

Each jack portion 52 has a lower leg segment 52a movable relative to an upper leg segment 52b by way of a rotatable crank member shown at 52c. In this case, the rotatable crank member is connected to the output shaft of the reduction gearbox 54a which in turn is coupled to the output shaft of the motor unit 54b.

Figure 3A:
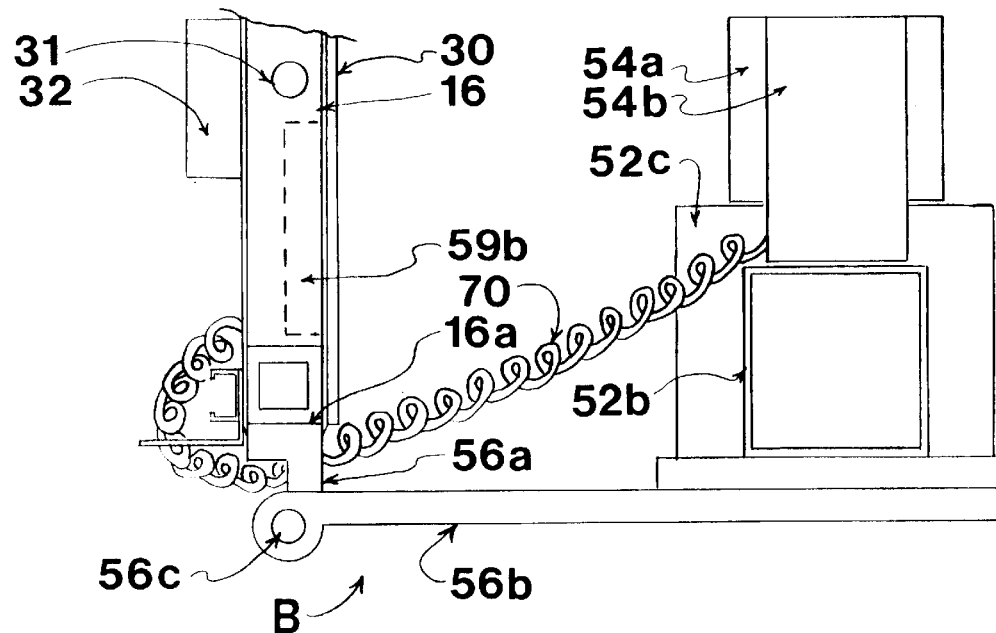
FIG. 3a is a sectional view taken on line 3a—3a of FIG. 3.
Figure 2A:
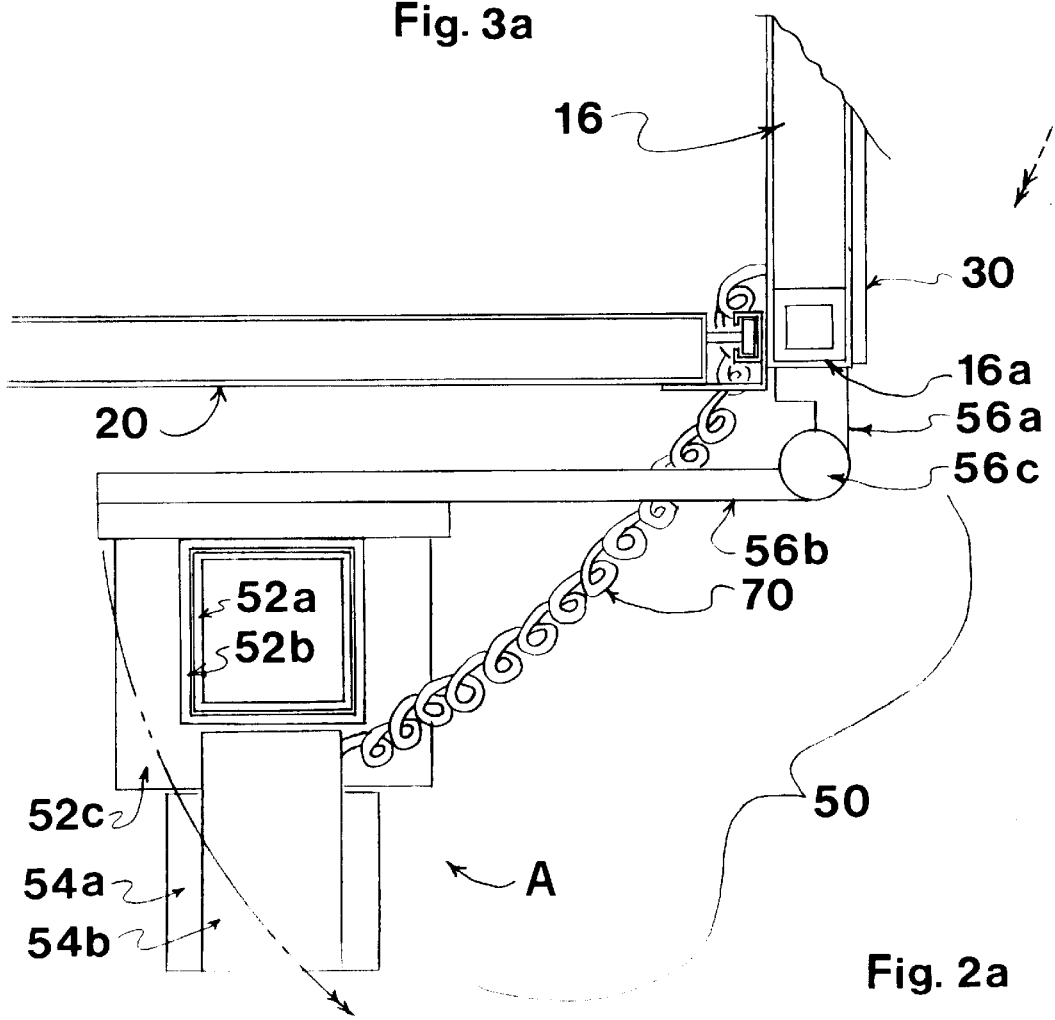
FIG. 2a is a sectional view taken on line 2a—2a of FIG. 2.

Each leg arrangement is movable between a storage or secured position shown in solid lines at 'A' in FIGS. 1 and 2 and an operative, or swung out, position 'B' in FIGS. 1 and 3 and a mounting means is provided in the form of a hinge assembly, such as three butt-type hinges, shown at 56, for mounting each of the leg arrangements to a corresponding wall portion. Referring to FIGS. 2a, 3a, each hinge 56 has a first hinge element 56a which is secured to the rear edge 16a of the wall portion 16 and a second hinge element 56b fixed to the leg arrangement with a pivot member 56c providing a vertical swing axis. Thus hinge assembly is arranged to pivotally mount each leg arrangement for movement between the storage and operable position about the vertical swing axis and to releasably lock the leg arrangements in place, such as in the storage and operative positions as shown. Each of the leg arrangements also has a lower end for engaging a ground surface, including a caster wheel 58.

The cover is provided with a lighting circuit which includes a number of clearance lights surface mounted on the front, rear and sides of the roof as shown at 59 in FIGS. 1 and 3a, in walls 16 in complementary recess formed therein for marker clearance lighting 59a and lower marker lighting shown at 59b in FIG. 1.

Figure 4A:
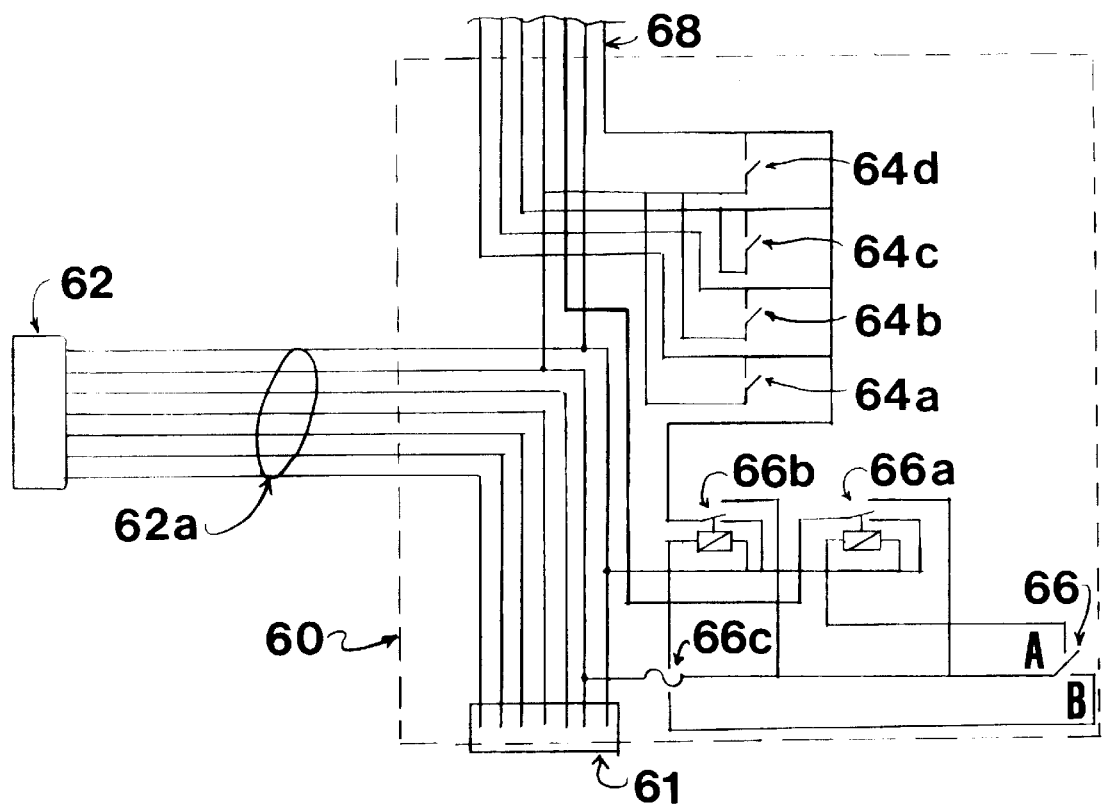
FIG. 4a is a more detailed schematic view of one component of the portion illustrated in FIG. 4.
Figure 4:
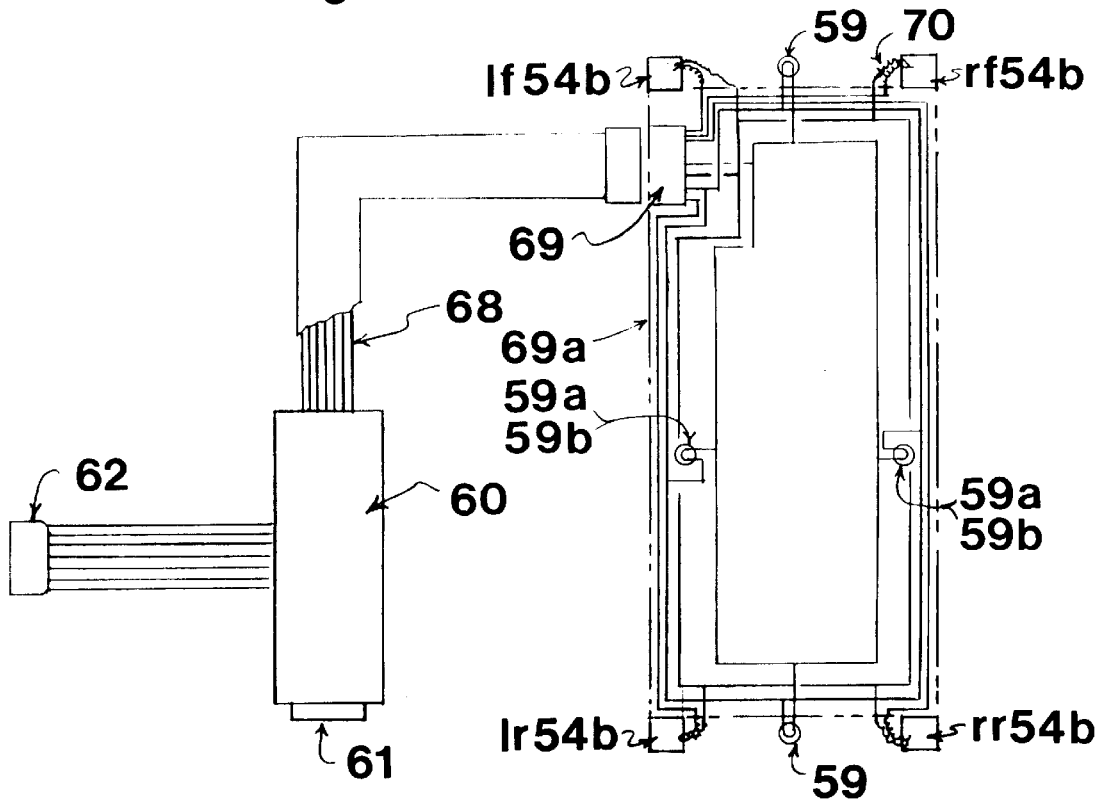
FIG. 4 is a schematic view of another portion of the cover illustrated in FIG. 1.
Figure 5:
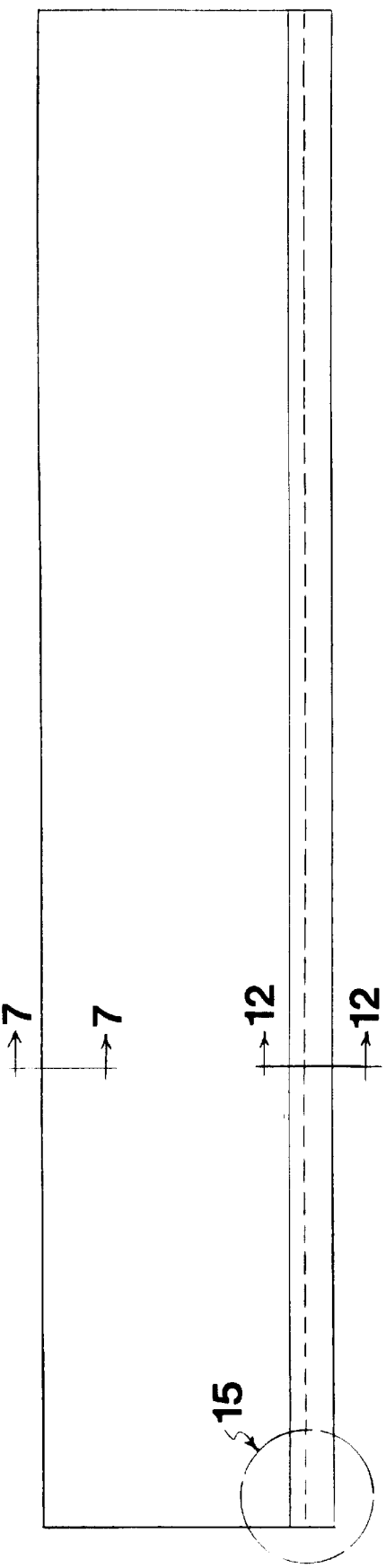
FIG. 5 is a side view of the cover illustrated in FIG. 1.
Figure 5A:
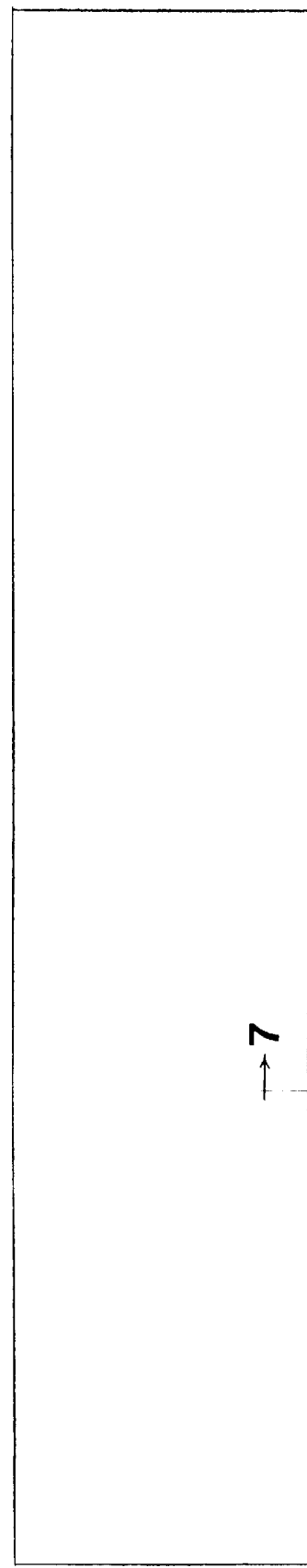
FIG. 5a is a plan view of the cover illustrated in FIG. 1.

Referring to FIG. 4, each motor unit is actuated by a controller 60 which receives power from the tractor by way of a plug 62 which fits an electrical outlet in the utility area behind the vehicle cab and is provided with a multiple strand cable as shown at 62a, each strand conveying a particular circuit. The controller also has an outlet plug 61 to be coupled with the trailer electrical hook-up plug, to continue the electrical circuitry from the tractor to the trailer. Referring to FIG. 4a, the controller 60 has a switching means in the form of four switch units 64a to 64d to convey the power to each of the motors, depending on the particular movement required, that is to raise or lower the specific leg arrangements. The switch units allow for the position of any corner of the cover to be adjusted individually depending on irregularities of the ground surface. The controller also includes a key switch 66 which serves as the main switching arrangement to simultaneously power all four motors, by way of two relays 66a, 66b, one for upward movement and the other downward movement. In this case, the key switch has a number of predetermined positions including a 'raise' position when the switch engages contact 'A', a 'lower' position when the switch engages contact 'B' and a manual override position when the switch is intermediate contacts 'A' and 'B' (wherein the motors may be actuated simultaneously to adjust the position of the cover). The switch 66 and its associated relays 66a, 66b are also provided with a thermal breaker shown at 66c. The controller is also provided with a self retractable cord shown schematically at 68 with a sufficient length from the controller to a designated electrical junction 69 on the cover, to join with a motor control circuit and a lighting circuit on the cover, shown generally at 69a. The control circuit extends through the conduit 31 in the lower skirt portion and includes individual lengths of coiled wire 70 to join each motor thereto. It will be understood that the cover will be provided with sufficient conduit to carry the electrical circuitry for the cover and this will also include lateral conduit through the roof and vertically through the walls (the latter of which is shown in FIG. 15).

The controller may be permanently mounted to the cab of the tractor unit or alternatively may be portable, that is with its own power supply to enable the cover to be adjusted in the absence of the tractor unit. An additional controller junction 69 may be located at the rear of the trailer for the portable controller or for attachment of another cover for multi-trailer configurations known as 'B trains'.

Figure 6:
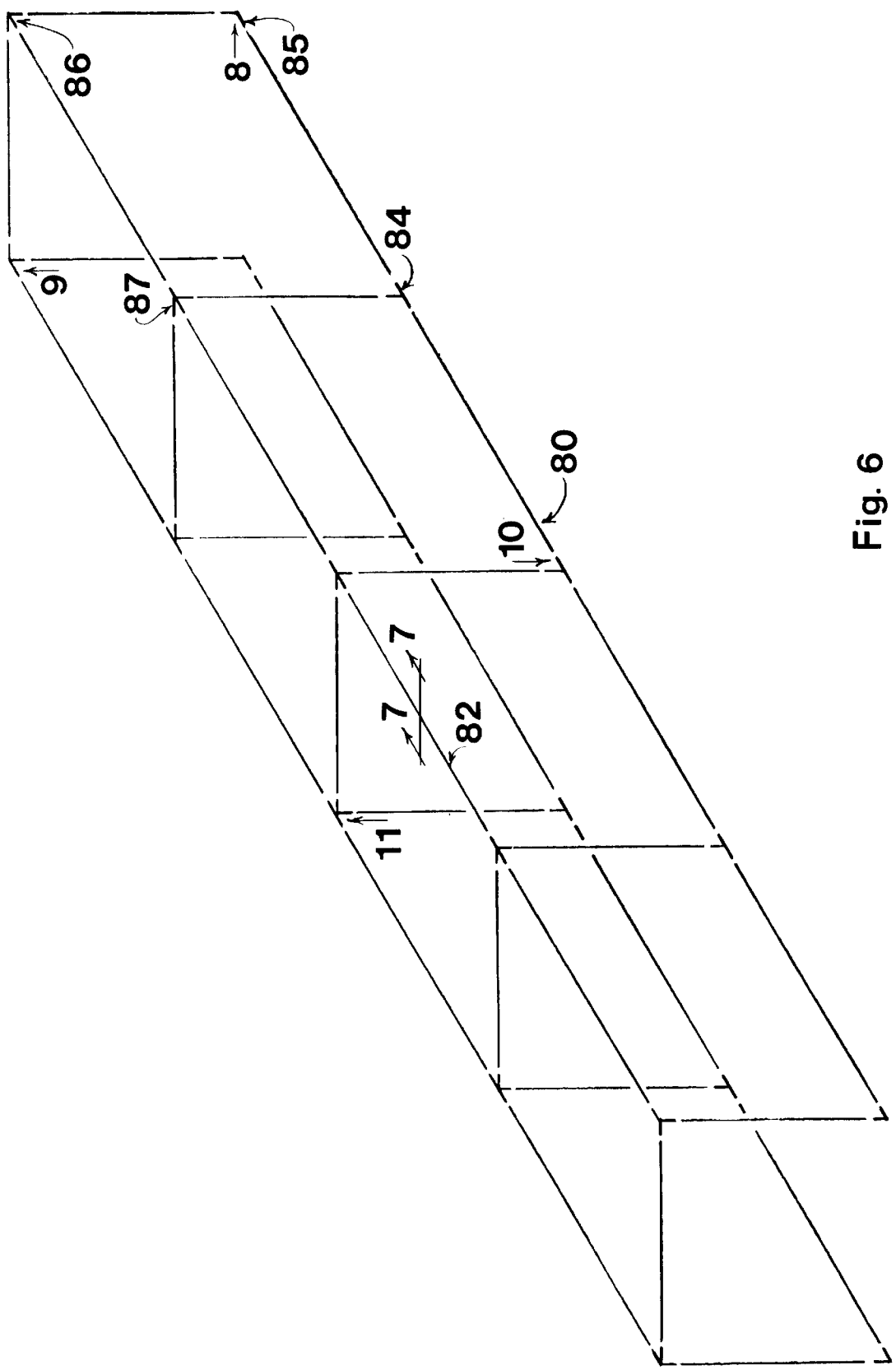
FIG. 6 is a perspective schematic view of an interior portion of the cover illustrated in FIG. 1.

As shown schematically in FIG. 6, the roof 14 and the side walls 16 are formed in a unibodied construction and includes a frame subassembly 80, the side wall and roof portions being integrally formed therewith. The subassembly should have standard dimensions such as 45'×7'10"×8'6" and is formed by a number of frame members such as square sectioned aluminium members 82 fixed to complementary bracket unions 84 to 87. These unions are provided in a number of configurations each of which includes a body member with a number of square sectioned legs extending outwardly therefrom. As shown in the case of union 85 in FIG. 8, each body 85a has a number of outer surfaces 85b to be coextensive with those of the frame members, while the legs each have a reduced rectangular cross section to fit the inner cross section of the frame members and are formed from a molded solid fibre reinforced phenolic composition.

Figure 7:
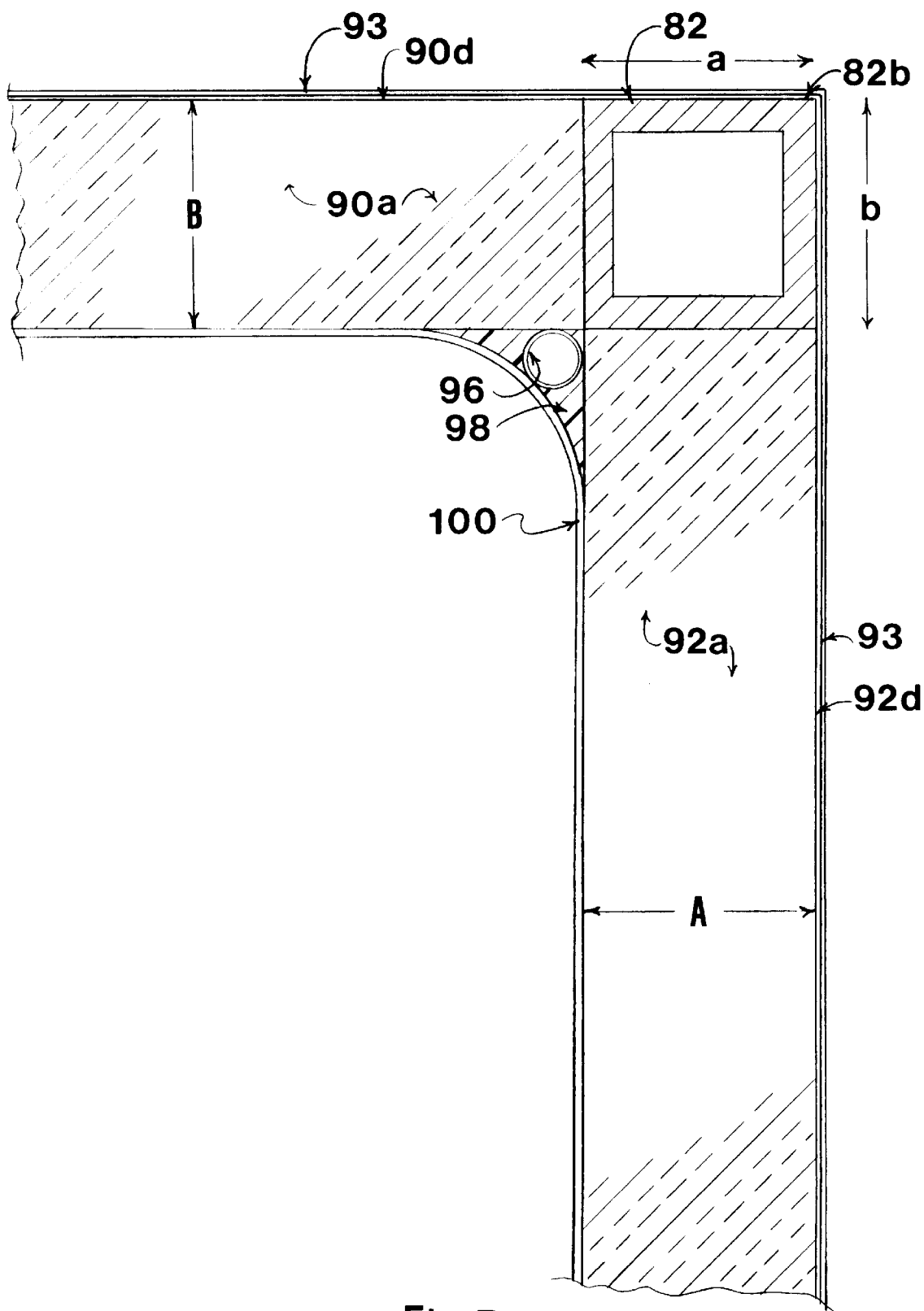
FIG. 7 is a sectional view taken on line 7—7 of FIG. 6.
Figure 10:
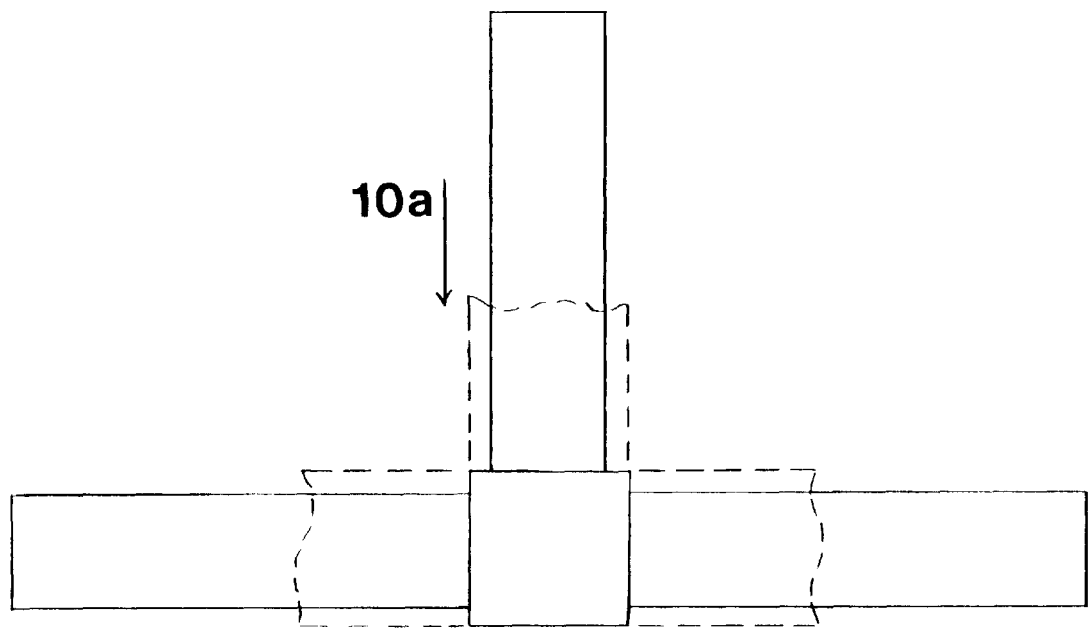
FIG. 10 is a fragmentary assembly view taken arrow 10 of FIG. 6.
Figure 10A:
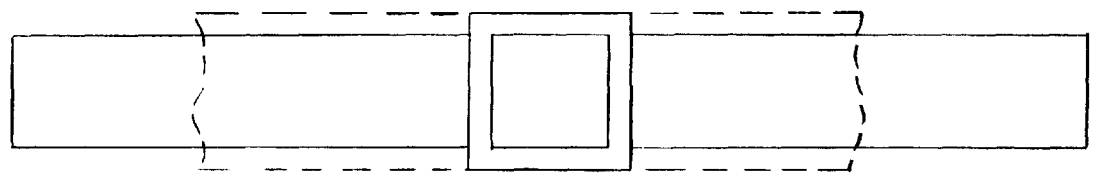
FIG. 10a is a view taken on arrow 10a of FIG. 10.
Figure 11:
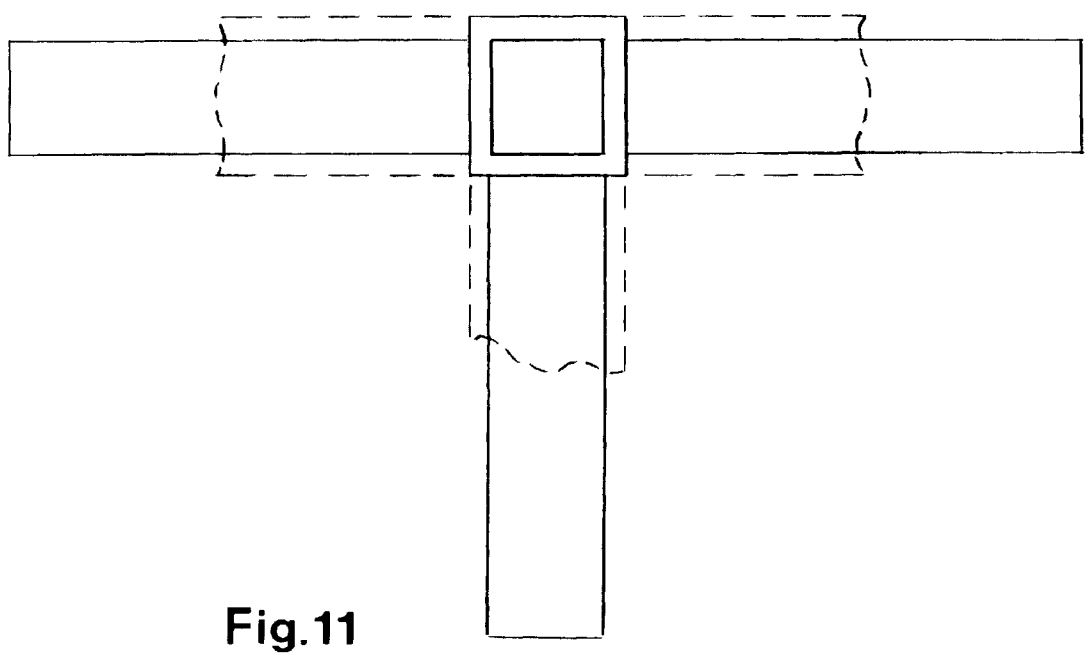
FIG. 11 is a fragmentary assembly view taken arrow 11 of FIG. 6.
Figure 12:
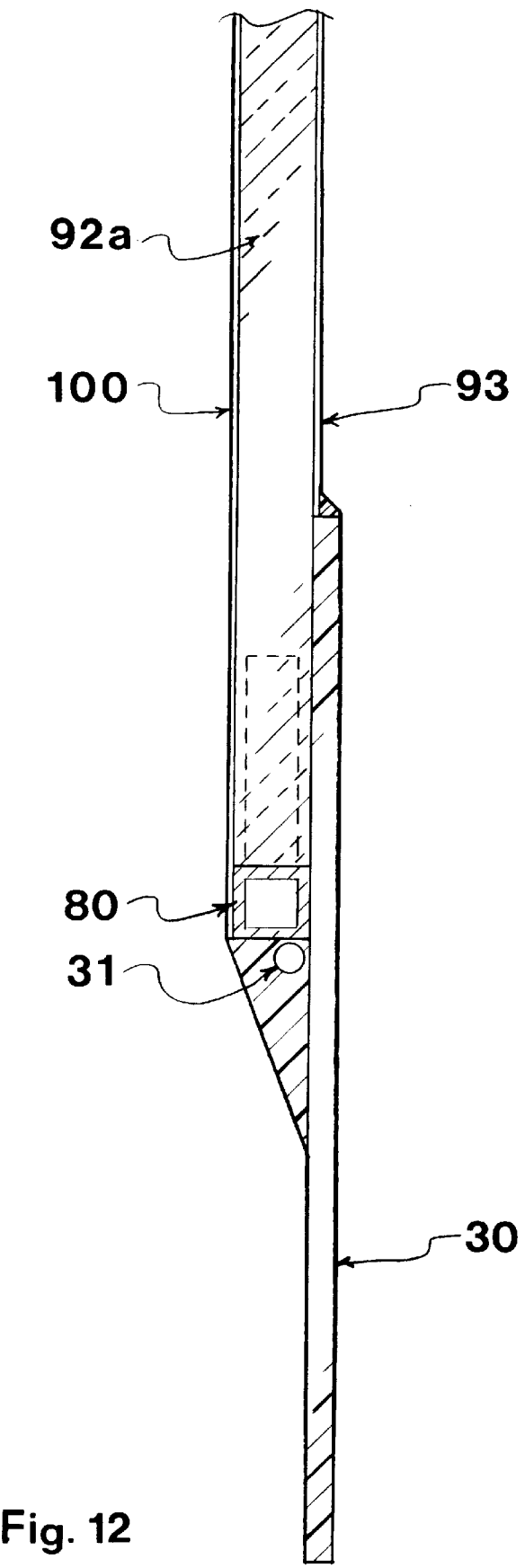
FIG. 12 is a sectional view taken on line 12—12 of FIG. 5.
Figure 13:
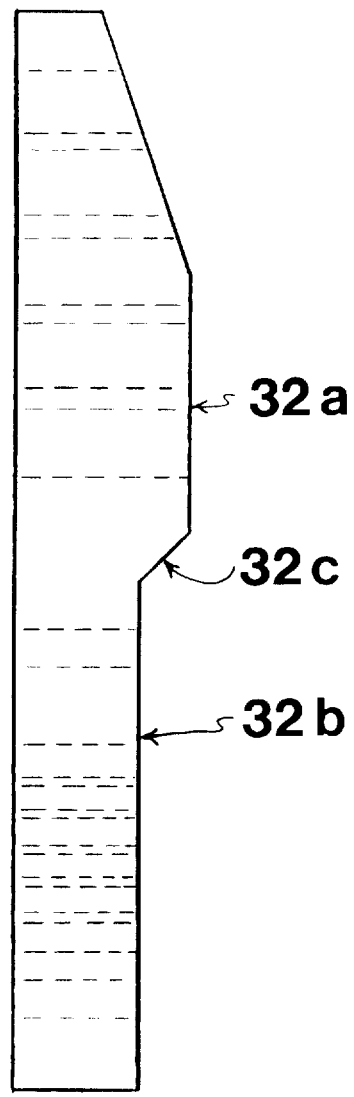
Figure 14:
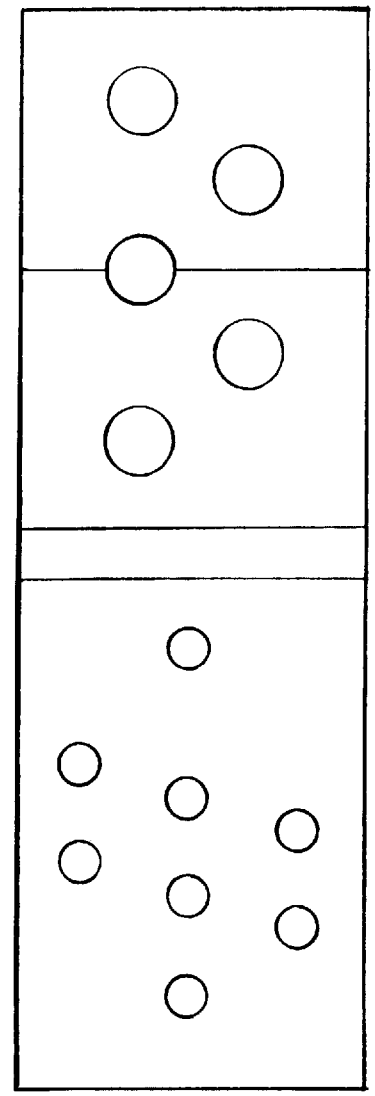
FIG. 14 is a front view of the portion illustrated in FIG. 13.

Referring to FIG. 7, each of the roof and side walls includes an interior expanded polymeric layer 90a, 92a and an exterior skin 93 bonded thereto. The frame members of the subassembly includes a plurality of intermediate vertical members and a plurality of intermediate horizontal members, one of which is shown at 82, each of the vertical and horizontal members having one dimension 'a' which is equal to the thickness 'A' of one adjacent layer and another dimension 'b' which is equal to the thickness 'B' of another adjacent layer. Each of the interior layers has a pair of edges in abutment with a corresponding pair of the vertical and horizontal members.

Each of the interior layers has an exterior face 90d, 92d and each of the vertical and horizontal members has an exterior face 82b which is coextensive with the exterior face of a corresponding interior layer and the exterior skin 93 is bonded to the coextensive exterior faces. The interior expanded polymeric layer is selected from expanded polyethylene, polyurethane or polyvinylchloride resin materials and has a relatively high density for rigidity and strength. The interior layers may also, if desired, be formed from materials such as plastic or aluminum honeycomb-type panel, or carbon fibre composite materials and the like.

The roof and side wall panels meet at a corner region, further comprising a conduit for receiving electrical wiring, for example a ¼ ID conduit 96 carrying the lighting circuit wiring which is held in position by a molded polymer material 98. An interior skin 100, similar to the exterior skin, extends across the entire inner surface area of the structure and is a laminated material, preferably a laminated phenolic material. However, the interior and exterior skins may also be formed from materials such as sheet aluminum, plastic materials such as polyethylene and polyvinylchloride, fibre reinforced plastic sheeting and the like and, if desired, may be provided with UV protective coatings.

To attach the cover to the flat deck semi-trailer, the vehicle operator first positions the rear end of the flat deck trailer in front of the cover and connects the controller with the electrical junction in the tractor's utility area to supply power to the cover. The self retractable cord 68 is then withdrawn from the controller and joined to the designated electrical junction on the cover.

The operator then manually opens both overhead doors to expose the cargo receiving passage, and moves the leg arrangements from their storage position to their operable position. The operator then activates the key switch to deliver power simultaneously to the four motors thereby to raise the cover to an elevated position with predetermined clearance above the cargo support surface of the flat deck trailer. The operator then backs the trailer through the front overhead door opening of the adjacent end wall portion to locate the cover above the cargo support surface.

The operator lowers the cover to a position nearer to the cargo support surface but still sufficiently spaced therefrom so that the operator can install the individual coupling members on the bearing skirt with the swivel lock steel pins by penetrating the mating holes in the bearing skirt and the coupling members thereby to tightly position the coupling member with the locking portion of the pin on inside face of coupling member (as shown in FIG. 1b.

The operator can then make subsequent adjustments as needed if any of the coupling members are interfering with load binders or existing rub rail supports for the cargo by simply selecting alternate passages. In this manner, each coupling member is arranged so that each is capable of penetrating a corresponding passage before lowering the cover in its final position with the rub rail in the gap as shown in FIG. 1b.

The cover is then secured to the flat deck semi-trailer in such a manner that the rub rail abuts the inclined face of the intermediate section thereby drawing the rub rail outer face in into tight engagement with the inner face of the lower skirt portion. The tension lock steel pins are then inserted through the coupling members below the rub rail. With the cover now in place, the operator retracts the leg arrangements to a position above the flat deck and thereafter pivots the leg arrangements to their storage position as shown in FIG. 1. The leg arrangements are then secured in place against the closed overhead doors, thereby completing the installation.

To remove the cover, the above procedure is reversed.

Thus, the present invention provides a cover which can be installed on a wide variety of semi-trailer vehicles such as flat deck trailers, including those with a preformed arch. The use of the coupling members allows the cover to adapt to specific dimensional variations between the trailers, including those with a preformed arch. In the latter case, the coupling members can be independently adjusted so that those in the central area of the cover extend to a lesser extent from the lower skirt portions than those in front and rear regions of the lower skirt portions.

Thus, one embodiment of the present invention provides a cover with a unitary structure that should fit a wide range of standard flat deck trailer configurations, including those referred to in the trucking industry as "high boy" and "low boy", without the need for alternations to the flat deck trailer itself.

While the above described cover is used in connection with a flat deck trailer, it should be recognized that the cover may be used for other trailer configurations including drop deck trailers, and multiple trailer configurations referred to in the trucking industry as 'A Trains, B Trains and C Trains'. In this case of drop deck trailers, the cover should have a length that would be equal to the length of the intermediate cargo supporting area of hte trialer, that is between the rear wheel assembly area and hte front fifth wheel interconnection area. Some of these trailers may not have a rub rail in place, in which case, other forms of coupling means may be used for removably coupling each of the longitudinal free edge regions of the side walls of the cover to a corresponding longitudinal edge region of the trailer.

While the above cover makes use of independently adjustable coupling members, it will be understood that the coupling members need not necessarily be independently adjustable but rather can be collectively mounted directly to one or more lower skirt portions. In this case, the skirt portion may, if desired, be adjustably mounted to the side wall portion.

While the above cover provides for tight engagement of the lower skirt portion with the outer face of the rub rail, the cover may if desired be coupled to the flat deck trailer by other forms of rails or other means to couple the longitudinal free edge region of each side wall to a corresponding longitudinal edge region on the flat deck. In addition shock absorbing members or similar components may be incorporated into the coupling means to minimize vibrations between the cover and the flat deck.

We claim:

1. A cover for a semi-trailer vehicle having a cargo support surface bordered by a pair of rub rail members, a number of passages formed between said cargo surface and each of said rub rail members, said cover comprising a pair of side walls, each of which terminate at a lower edge region; a plurality of coupling members, each for engaging a corresponding passage, attachment means for independently attaching each coupling member to a corresponding lower edge region, so that each coupling member is both vertically and longitudinally adjustable in order to engage a selected one of a number of said passages.

2. A cover as defined in claim 1 wherein each of said coupling members includes a lower section to extend through said passage, and an upper section for removable attachment to said lower edge region.

3. A cover as defined in claim 2 further comprising a plurality of holes formed in said lower edge region and said upper section, said adjustment means includes a plurality of releasable fasteners for extending through selected ones of said mating holes, wherein each of said coupling members may be independently located by a corresponding selection of mating holes.

4. A cover as defined in claim 3 wherein said lower section is laterally spaced from said lower edge region to form a transverse gap therebetween, wherein said rail member extends into said gap in said second position.

5. A cover as defined in claim 4 wherein said coupling member further includes an intermediate section with an inner surface inclined relative to said gap to draw said rail member into abutment with said lower edge region.

6. A cover as defined in claim 5 further comprising releasable lock means for inhibiting removal of each of said coupling members from a corresponding passage.

7. A cover as defined in claim 6 wherein said lifting means includes a plurality of length adjustable leg arrangements arranged to extend below said cover.

8. A cover as defined in claim 7 wherein each of said leg arrangements is movable between a storage position and an operative position laterally outwardly spaced from said cover.

9. A cover as defined in claim 8 further comprising a pair of end walls joined to said roof and side walls, at least one of said end walls including an access passage.

10. A cover as defined in claim 9 wherein each of said end walls includes a retractable door to expose said access passage.

11. A cover as defined in claim 10 further comprising a unitary frame structure defining a roof and said side walls, said frame structure comprising a plurality of longitudinal and transverse frame members.

12. A cover as defined in claim 11 wherein each of said frame members has an inner surface adjacent said cargo receiving passage and an outer surface opposite thereto, further comprising a plurality of wall panels, each between a pair of said frame members, each of said wall panels having inner and outer surfaces coextensive with the inner and outer surfaces of said pair of frame members.

13. A cover as defined in claim 8 wherein each of said leg arrangements includes a motor for extending said leg arrangements between a retracted position and an extended position.

14. A cover as defined in claim 13 further comprising controller means for controlling the motors of said leg arrangements.

15. A cover as defined in claim 8 wherein each of said leg arrangements is movable between a storage position and an operative position about a vertical hinge axis.

16. A cover as defined in claim 1 wherein said cover is a unitary construction including said side walls and a roof.

17. A cover as defined in claim 16, further comprising clearance and marker lights located on said side walls.

18. A method of covering cargo on a semi-trailer vehicle having a cargo support surface bordered by a pair of longitudinal edge regions, comprising the steps of:

providing a cover with a roof and a pair of side walls forming a cargo receiving passage there between;

providing each of said pair of side walls with a longitudinal free edge region in order to expose said cargo receiving passage to said cargo support surface lifting said cover to a first position above said cargo support surface;

lowering said cover to a second position in abutment with said cargo support surface, and removably coupling each of said longitudinal free edge regions to a corresponding longitudinal edge region, wherein each of said longitudinal edge regions includes a longitudinal rail member and a plurality of passages adjacent said rail member said coupling step includes the step of providing a plurality of coupling members, each of which is dimensioned to extend through a corresponding passage, and independently attaching each coupling member to a corresponding lower edge region, so that each coupling member is both vertically and longitudinally adjustable in order to engage a selected one of a number of said passages.

* * * * *